(12) United States Patent
Masumura et al.

(10) Patent No.: US 10,800,080 B2
(45) Date of Patent: Oct. 13, 2020

(54) TAPE-SHAPED MOLDING AND BELT FOR BALL CHAIN

(71) Applicant: THK CO., LTD., Tokyo (JP)

(72) Inventors: Nobuyuki Masumura, Tochigi-Ken (JP); Kazuki Tomita, Tochigi-Ken (JP); Akira Tochigi, Tochigi-Ken (JP); Yuji Kokuno, Tochigi-Ken (JP); Seiichi Ohira, Tochigi-Ken (JP); Hidekazu Michioka, Tokyo (JP); Katsuya Iida, Yamanashi-Ken (JP)

(73) Assignee: THK CO., LTD., Tokyo (JP)

( * ) Notice: Subject to any disclaimer, the term of this patent is extended or adjusted under 35 U.S.C. 154(b) by 445 days.

(21) Appl. No.: 15/072,959

(22) Filed: Mar. 17, 2016

(65) Prior Publication Data

US 2016/0193764 A1 Jul. 7, 2016

Related U.S. Application Data

(62) Division of application No. 13/408,043, filed on Feb. 29, 2012, which is a division of application No. (Continued)

(30) Foreign Application Priority Data

Mar. 26, 2002 (JP) ................................ 2002-085118
Mar. 24, 2003 (JP) ................................ 2003-080108

(51) Int. Cl.
*B29C 45/14* (2006.01)
*B29C 45/00* (2006.01)
(Continued)

(52) U.S. Cl.
CPC .... *B29C 45/14549* (2013.01); *B29C 45/0001* (2013.01); *B29C 45/36* (2013.01); (Continued)

(58) Field of Classification Search
CPC ................................................ B29C 45/14549
See application file for complete search history.

(56) References Cited

U.S. PATENT DOCUMENTS

| 3,878,734 A | 4/1975 | Zeidman et al. |
| 4,344,908 A * | 8/1982 | Smith ..................... B29C 70/10 |
| | | 264/203 |

(Continued)

FOREIGN PATENT DOCUMENTS

| EP | 1083347 | 3/2001 |
| JP | 05-052217 | 3/1993 |

(Continued)

OTHER PUBLICATIONS

Askeland, Donald, "The Science and Engineering Materials," 1994, PWS Publishing Company, pp. 540-543.

*Primary Examiner* — Robert A Vetere
(74) *Attorney, Agent, or Firm* — Wenderoth, Lind & Ponack, L.L.P.

(57) ABSTRACT

A tape-shaped product and a belt for a ball chain are provided. A tape-shaped product of synthetic resin includes a tape of a thermoplastic resin, and a preliminarily stretched fibrous member of a thermoplastic resin contained therein along longitudinally parallel edges or in proximity thereto of the tape. A belt for a ball chain, includes a tape-shaped product of synthetic resin formed by injection molding, together with a fibrous member as an insert of a resin of the same kind as that of the fibrous member so that the fibrous member is disposed along the longitudinal edges or in proximity thereto, ball-insetting holes are disposed at equal intervals, and ball-retaining projections are disposed around the holes.

3 Claims, 8 Drawing Sheets

Related U.S. Application Data

10/508,788, filed as application No. PCT/JP03/03684 on Mar. 26, 2003, now Pat. No. 8,764,302.

(51) Int. Cl.
*B29C 45/36* (2006.01)
*F16C 29/06* (2006.01)
*F16H 25/22* (2006.01)
*F16C 33/38* (2006.01)
*F16C 33/50* (2006.01)
*F16C 43/06* (2006.01)
*B29K 101/12* (2006.01)
*B29L 29/00* (2006.01)

(52) U.S. Cl.
CPC ...... *F16C 29/0635* (2013.01); *F16C 33/3825* (2013.01); *F16C 33/3831* (2013.01); *F16C 33/506* (2013.01); *F16C 43/06* (2013.01); *F16H 25/2233* (2013.01); *B29C 2045/363* (2013.01); *B29K 2101/12* (2013.01); *B29K 2995/0049* (2013.01); *B29K 2995/0077* (2013.01); *B29L 2029/00* (2013.01); *F16C 2208/20* (2013.01); *F16C 2220/04* (2013.01); *Y10T 428/24994* (2015.04)

(56) References Cited

U.S. PATENT DOCUMENTS

| | | | |
|---|---|---|---|
| 4,536,536 A | 8/1985 | Kavesh et al. | |
| 5,553,946 A | 9/1996 | Agari | |
| 5,852,135 A * | 12/1998 | Kanai | C08F 283/06 |
| | | | 525/398 |
| 5,902,642 A * | 5/1999 | Horiki | B05B 12/20 |
| | | | 427/282 |
| 6,103,805 A | 8/2000 | Kojima et al. | |
| 6,610,766 B1 | 8/2003 | Kitamura et al. | |
| 2004/0057640 A1* | 3/2004 | Michioka | F16C 29/0635 |
| | | | 384/43 |

FOREIGN PATENT DOCUMENTS

| | | |
|---|---|---|
| JP | 05-196037 | 8/1993 |
| JP | 11-247856 | 9/1999 |
| JP | 2001-074048 | 3/2001 |

* cited by examiner

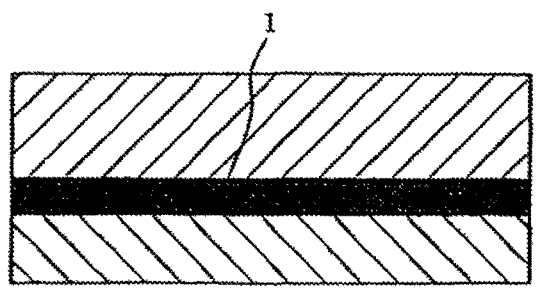
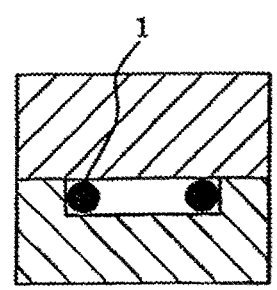
FIG. 3A   FIG. 3B
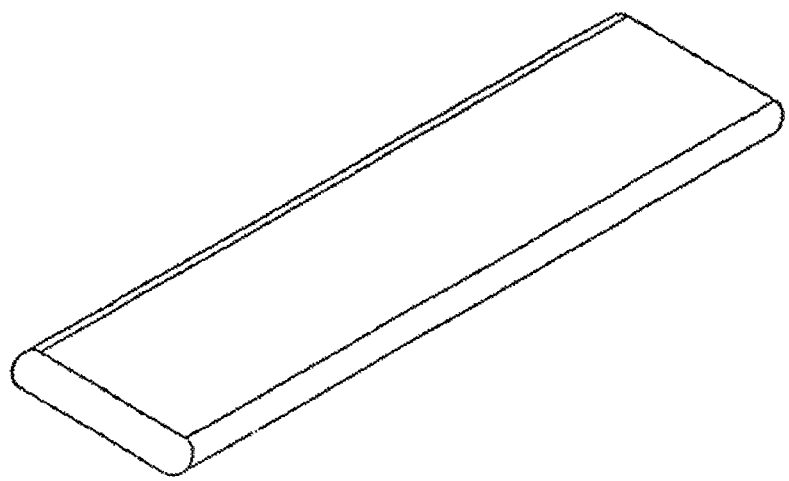
FIG. 4
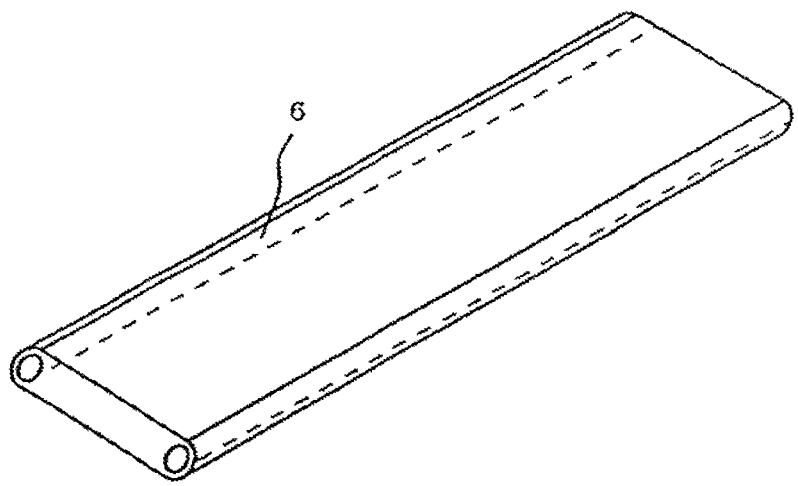
FIG. 5

TAPE-SHAPED MOLDING AND BELT FOR BALL CHAIN

TECHNICAL FIELD

The present invention relates to a tape-shaped product and a belt for a ball chain used in a guide device for linear motion on a track utilizing rolling of a plurality of rolling members, such as balls or rollers (hereinafter representatively referred to as "ball(s)").

BACKGROUND ART

Hitherto, various tape-shaped products of thermal resins are known, but almost no proposals have been made regarding a tape-shaped product suitable for forming a belt including a planar tape portion provided with a multiplicity of holes for retaining another object thereat. As an example of such a belt including a planar tape portion provided with a multiplicity of holes for holding another object thereat, there is an endless belt retaining balls rollably thereon for a guide device for linear motion on a track. As disclosed in Japanese Laid-Open Patent Application (JP-A) 5-52217, such a belt includes ball-retaining portions intervening a plurality of balls arranged with prescribed intervals in a row, and a flexible connecting member for connection between respective ball-retaining portions.

For production of a belt for a ball chain (hereinafter sometimes referred as a ball chain belt), there are known a method of forming prescribed ball-retaining holes in an extruded tape, and a method of direct injection molding without such a tape product. An example of the former method is disclosed in JP-A 2001-74048 wherein an elongated flat tape product (i.e., a belt member) is preliminarily formed by extrusion and is cut in a prescribed length to form a row of holes for loosely retaining balls, and spacer portions are formed between adjacent retaining holes for retaining balls while using the balls as inserts. In a case of forming a tape product (a belt member) by extrusion of a synthetic resin and then forming ball-retaining holes for retaining balls rollably, it is difficult to obtain a strength sufficient for using this product as an endless belt subject to sliding movement.

Further, adhesion between spacer portions formed by injection molding and the belt member is insufficient so as to cause dropping-off of the spacer portions. For this reason, for a purpose of ensuring a tensile strength and a flexural strength of the belt member, JP-A 2001-74048 also discloses a method of using two extruders for extruding a resin functioning as a reinforcing material and a resin coating the reinforcing material to form a tape portion through a common die, and an extrusion forming method of embedding reinforcing members, such as glass fiber, carbon fiber or ceramic fiber along parallel longitudinal edges of a flat band-shaped belt. However, the above-mentioned method of co-extruding two types of resins for forming a reinforcing member cannot provide a sufficient strength, and if a large ratio of stretching is applied thereto for providing an increased strength, thermal shrinkability becomes larger, so that this product is not suitable for such use as an endless belt for retaining balls rollably in a linear motion guide device. On the other hand, the fiber, such as glass fiber, carbon fiber or ceramic fiber, of a material different from belt-forming material cannot be sufficiently strongly bonded with the belt-forming material, whereby these materials are liable to form a gap therebetween due to various loads during use, and strength is rapidly lowered if this gap occurs, thus involving a problem regarding durability.

Further, in another method of producing a ball chain belt as disclosed in, e.g., JP-A 11-247856, ball frames having a diameter larger than that of balls used for the ball chain are aligned in projections at prescribed intervals in a metal mold for injection molding of synthetic resin, and a synthetic resin is injected into the metal mold to form a connecting belt with the ball frames aligned therein, followed by removal of the connecting belt from the metal mold and pushing-in of balls into the ball frames of the molded product so as to rollably retain the balls therein. According to this method, it is very difficult to develop a sufficient size accuracy, and even if a sufficient accuracy can be attained, metal mold production costs become very expensive. Further, the removal of this product from the mold is difficult, and a proportion of defectives is liable to be higher due to occurrence of fins around the holes.

In another method as disclosed in, e.g., JP-A 5-196037, a plurality of ball pieces disposed between balls and a connecting band, connecting the ball pieces and provided with ball holes for receiving the balls, are integrally formed by injection molding. During the injection method, resins injected out of respective gates are joined together at an intermediate point between the gates to form a weld, of which a strength is liable to be lowered.

As described above, there has not been provided a tape-shaped product suitable for forming a belt including a planar tape portion provided with a multiplicity of holes for retaining another object thereat. Further, production of the belt members according to the above-mentioned methods is complicated, and it is difficult to attain a desired strength being exhibited by the products.

SUMMARY OF THE INVENTION

The inventors have studied for a purpose of providing a tape-shaped product suitable for forming a belt including a planar tape portion provided with a multiplicity of holes for retaining another object thereat and having a large tensile strength, and a shaped product having a large tensile strength as a belt chain belt having a large tensile strength for rollably retaining balls aligned in a row, to arrive at the present invention.

An object of the present invention is to provide a tape-shaped product suitable for forming a belt including a planar tape portion provided with a multiplicity of holes, or a belt for retaining another object at such holes, or a belt for a ball chain (i.e., a ball chain belt) exhibiting excellent ball-retaining power and durability.

The present invention relates to a tape-shaped product of thermoplastic resin which contains a preliminarily stretched fibrous member of thermoplastic resin (hereinafter referred to as "stretched fibrous member") along longitudinally parallel edges or in proximity thereto. It is preferred that the stretched fibrous member comprises a resin exhibiting good adhesion, and being moldable together, with the resin forming the tape, and that the tape-shaped product has a longitudinal tensile strength of at least 250 MPa and a thermal shrinkability of at most 1%, more preferably a longitudinal tensile strength of at least 300 MPa and a thermal shrinkability of at most 0.5%

The present invention further relates to a tape-shaped product of synthetic resin formed by injection molding resin together with a stretched fibrous member, of a thermoplastic resin exhibiting good adhesion, with the stretched fibrous member, and provided with the stretched fibrous member contained therein at positions along longitudinally parallel edges or in proximity thereto, ball-insetting holes disposed at equal intervals in a straight line, and ball-retaining members (which need not hold the balls but are sufficient if they prevent direct contact of mutually adjacent balls). In the ball chain belt of the present invention, the stretched fibrous member may comprise a synthetic resin exhibiting good adhesion, and moldability together, with the resin forming the belt, and the belt may exhibit a tensile strength of at least 100 MPa, a ball-retaining power of at least 30 MPa when balls are inset in the ball-insetting holes, and a thermal shrinkability of at most 1%. It is preferred that the tensile strength is at least 150 MPa, the ball-retaining power is at least 45 MPa when the balls are inset in the ball-insetting holes, and the thermal shrinkability is at most 0.5%. In this instance, it is sufficient that the stretched fibrous member is disposed at positions outside the insetting holes.

BRIEF DESCRIPTION OF THE DRAWINGS

FIGS. 3A and 3B show states of stretched fibrous members being set in a mold for forming a tape-shaped product of the invention, including a longitudinal sectional view (FIG. 3A), and a lateral sectional view (FIG. 3B).

FIG. 4 is a perspective view of a comparative tape-shaped product not containing stretched fibrous members.

FIG. 5 shows a comparative composite tape-shaped product containing co-extruded cores.

Respective symbols correspond to respective component members as follows.

1: stretched fibrous member, 2: tape member, 3: ball-retaining hole, 4: ball-retaining member, 5: ball for molding, 6: core, 7: ball-insetting state, 8: mold, 9: roller-retaining hole, 10: roller-retaining member, 11: linear motion guide device, 12: tracking rail, 13: movable block body, 14: ball chain, 15: linear motion guide device, 16: tracking rail, 17: movable block body, 18: roller-type ball chain, 19: ball screw, 20: screw shaft, 21: nut, 22: return pipe, 23: ball chain (ball belt and balls)

DETAILED DESCRIPTION OF THE PREFERRED EMBODIMENTS

Figure 1:
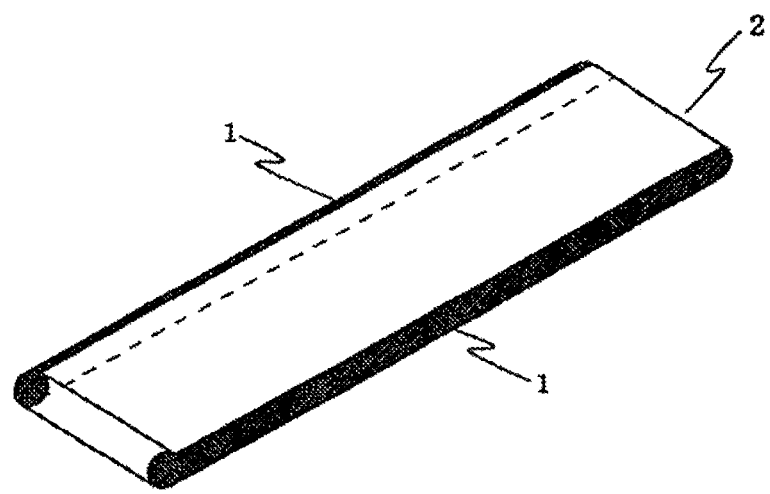
FIG. 1 is a perspective view showing a tape-shaped product of the invention.

A tape-shaped product according to a first embodiment of the invention is shown in FIG. 1, and comprises stretched fibrous members 1 and injected resin 2. The stretched fibrous members 1 are set in advance in a mold so as to be contained in a resultant molded product along longitudinally parallel edges or positions proximate thereto of the molded product, and a resin moldable together with and having good adhesion with the stretched fibrous members is molded by injection to form tape-shaped member (injection-molded resin member) 2 integral with the stretched fibrous members 1. As a result, it is possible to obtain a resinous tape-shaped product having a longitudinal tensile strength of at least 250 MPa and a thermal shrinkability of at most 1%; preferably a longitudinal tensile strength of at least 300 MPa and a thermal shrinkability of at most 0.5%. Incidentally, thermal shrinkabilities are based on values measured after allowing samples to stand for 24 hours under no tension at 40° C. (dry).

Figure 2A:
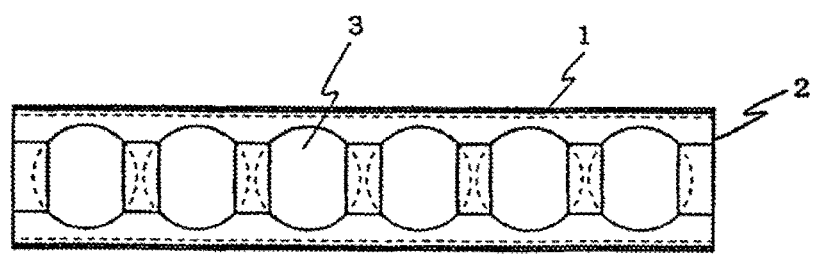
FIGS. 2A-2C show a ball chain belt of the invention, including a planar view (FIG. 2A), a longitudinal sectional view (FIG. 2B) and a lateral side view (FIG. 2C).
Figure 2B:
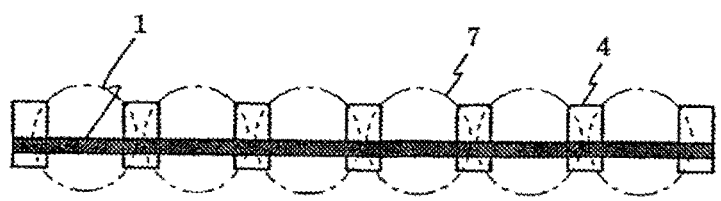
Figure 2C:

A ball chain belt according to a second embodiment of the invention is shown in FIGS. 2A-2C including a planar view (FIG. 2A), a longitudinal side view (FIG. 2B), and a lateral side view (FIG. 2C), and comprises stretched fibrous members 1 along longitudinally parallel edges or at positions proximate thereto of a tape-shaped product, a tape-shaped member (of injection-molded resin) 2, a multiplicity of ball-insetting holes 3 disposed at equal intervals aligned in a central portion of the tape-shaped member 2, and ball-retaining members 4 each disposed between adjacent ball-insetting holes 3. In this instance, it is sufficient that the stretched fibrous members 1 are disposed at positions outside the ball-insetting holes 3. Dashed lines 7 in FIG. 2B each represents a state of a ball being inset in position.

Figure 6:
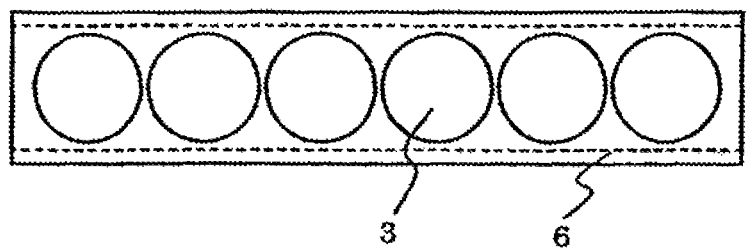
FIG. 6 is a view showing a state of forming ball-insetting holes in a tape-shaped product of the invention.
Figure 7:
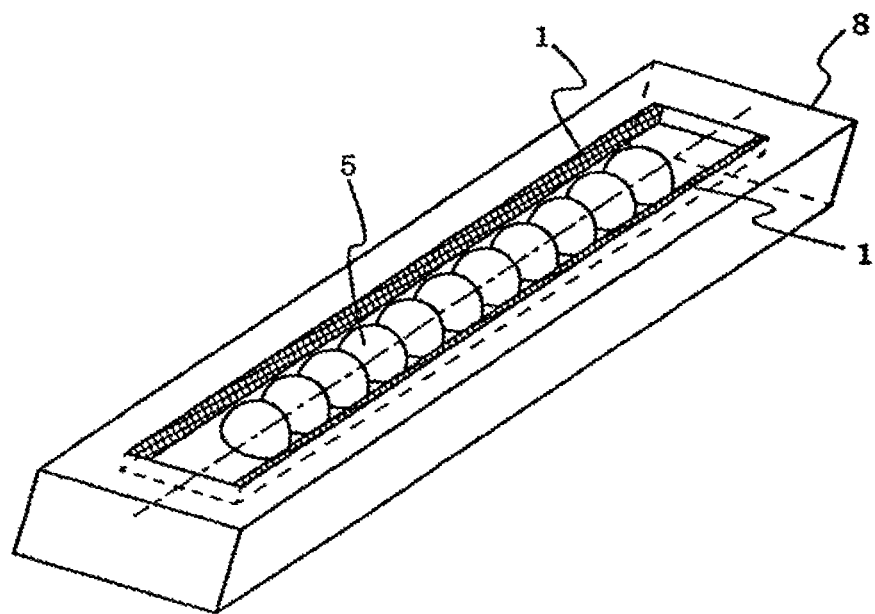
FIG. 7 is a view showing a state wherein stretched fibrous members and balls are set in a mold for forming a ball chain belt of the invention.

A ball chain belt of the present invention as described above may be produced in the following manner. That is, in a tape-shaped product containing stretched fibrous members (FIG. 1) produced in the above-described manner, holes 3 having a diameter slightly larger than that of a ball (or roller) retained therein are formed at equal intervals by perforation as shown in FIG. 6, balls for molding are inset in the holes 3, and ball-retaining members 4 are formed in projection by injection molding around the holes 3. Alternatively, without such a tape-shaped product, balls 5 having a diameter slightly larger than that of a ball to be retained and stretched fibrous members 1 are disposed in a mold as shown in FIG. 7, and a prescribed resin is injection-molded to integrally form the tape member 2 and the retaining members 4. Thus, a shaped product containing the stretched fibrous members along longitudinally parallel edges, or at positions proximate thereto and fixing a mid portion of the balls, is formed, and then the balls for molding are removed to provide a ball chain belt. By using the ball chain belt, prescribed balls to be retained are inset at respective holes to provide a ball chain rollably retaining the balls.

Herein, preliminarily stretched fibrous member(s) refers to a fibrous member including oriented molecular chains obtained by stretching a yet-unstretched fibrous member formed by fiber spinning. This stretching may be performed by any method capable of providing an enhanced orientation of the fibrous member. For example, it is possible to adopt a method of subjecting such a yet-unstretched fibrous member continuously to a stretching step. Alternatively, such a yet-unstretched fibrous member may be later subjected to a separate stretching step. The stretching may be effected in a single step or multiple steps including two or more steps, and may also include a step of heat-treatment, and the like. A stretching medium may be gas, liquid or a hot plate and need not be restricted particularly. Further, it is also possible to adopt a direct spinning-stretching method wherein a resin ejected out of a spinning nozzle is subjected to drafting. A preliminarily stretched fibrous member of thermoplastic resin may comprise stretched fiber having a tensile strength of at least 300 MPa, preferably 450-1000 MPa and may be in the form of a mono-filament or multi-filaments. The stretched fibrous member may comprise composite-structured fiber (e.g., core/sheath structure), combined yarn fiber, twisted yarn fiber or non-circular section fiber, or any other form so long as it can retain an adhesion with the injected resin to exhibit a sufficient strength. As a preliminarily stretched fibrous member of thermoplastic resin, it is preferred to use a mono-filament (in a sense of including a core-sheath type composite yarn) of a resin of the same kind as the resin for injection molding.

These resins moldable together and exhibiting good adhesion with each other need not be entirely identical but may be those including principal components of identical resins, may be resins of a same type or family, or may include a stretched fibrous member of which a surface is chemically or physically treated to exhibit such an adhesiveness as not to cause a practically easy separation. The resin for injection molding is not particularly restricted so long as it allows injection molding, but may comprise various elastomers (e.g., polyester-type, nylon-type, polyolefin-type, acryl-type, fluorine-containing resin-type), or various synthetic resins (e.g., polyester-type, nylon-type, polyolefin-type, acryl-type, fluorine-containing resin-type), and the like.

Specific combinations of the stretched fibrous member and the injection molding resin may include a combination of identical resins, and also combinations of a PVDF/PMMA core/sheath composite yarn and acryl-type elastomer, polyester-type elastomer, PBT-type elastomer, or the like; a PVDF/PMMA mixture fiber and the above-mentioned elastomer; and PMMA-impregnated UHMWPE fiber string and PMMA, and the like.

In the tape-shaped product formed from the stretched fibrous member and a resin moldable together and exhibiting good adhesion therewith through injection molding, the stretched fibrous member may desirably occupy a ratio of 10-70%, preferably 20-60%, of a sectional area perpendicular to a longitudinal direction. The ratio can vary depending on a size, desired strength, and the like, of the tape-shaped product.

In the tape-shaped product of the present invention, the molded resin portion other than the fibrous members has an orientation which is lower than that of the fibrous members and in such a degree as to provide a thermal shrinkability of the tape-shaped product of preferably at most 1%, more preferably at most 0.5%.

The tape-shaped product of the present invention may have a shape of section perpendicular to the longitudinal direction, which shape is not restricted to a quadrangle or rectangle having four sides, but may also be a trigon, a polygon, each capable of including one or more curved sides, or further an ellipse or a shape formed by dividing an ellipse into two halves.

The tape-shaped product of the present invention may have a section as described above exhibiting a ratio of a maximum thickness to a width in a range of 1:50-1:1, preferably 1:20-1:1, further preferably 1:15-1:2. It is particularly preferred that the tape-shaped product has a sectional shape of a rectangle exhibiting a ratio of a maximum thickness to a width of 1:15-1:2.

A ball chain obtained by insetting balls in a tape-shaped product of the present invention may preferably be used as a ball-connecting member in a linear motion guide device equipped with a ball-retaining endless circulation path, and in a ball screw device as disclosed in, e.g., JP-A 11-37246.

EXAMPLES

Hereinbelow, the present invention will be described more specifically based on Examples and Comparative Examples. Incidentally, measurement conditions for thermal shrinkability, tensile strength and elongation in the following Examples and Comparative Examples are as follows.
(Measurement method and measurement conditions)
(1) Thermal Shrinkability
Measured at a temperature of 40° C. (dry) for a time of 24 hours.
(2) Tensile Strength and Elongation
Measured by subjecting a test piece of 50 mm in length to a tensile speed of 50 mm/min. by using Tension UCT=100Model (made by Orientec K.K.) in an environment at a temperature of 23° C.
(3) Ball-Retaining Strength of Ball Chain Belt
A ball is inset in a third hole from an end of a ball chain belt, which is then subjected to measurement in the same manner as that for tensile strength.
A ball chain belt is provided with circular holes and therefore has different sectional areas at respective positions, and breakage occurs at a portion of a smallest sectional area. The ball-retaining strength is calculated based on the smallest sectional area.

Physical properties of products obtained in Examples and Comparative Examples are inclusively shown in Tables 1 and 2.

Example 1

A polyester elastomer of MFR=10 was spun at a resin temperature of 240° C. through a 50 mm-dia. extruder to form an unstreched filament. The unstretched filament was stretched at 5.8 times in a hot air oven of 150° C. and relaxed by 10% in a hot air oven at 180° C. to obtain a stretched filament of 200 u m. The stretched filament exhibited a tensile strength of 470 MPa and an elongation of 86%.

Then, the stretched filament was set in a mold for injection molding as shown in FIGS. 3A and 3B, and an identical resin as the stretched filament was injected at 280° C. in the mold to form a tape-shaped product as shown in FIG. 1 having a width of 0.65 mm and a thickness of 0.24 mm. The stretched filament occupied 40% of a sectional area perpendicular to a longitudinal direction. As is understood from the physical properties shown in Table 1, the tape-shaped product exhibited a high tensile strength, a low thermal shrinkability, and thus a good size accuracy.

Comparative Example 1

Comparative Example 1-(1)

An identical resin as in Example 1 was used in the same manner as in Example 1 except for not setting a stretched filament to form a tape-shaped product as shown in FIG. 4 having a width of 0.65 mm and a thickness of 0.24 mm. This product exhibited a much lower tensile strength of 61 MPa than the tape-shaped product of Example 1.

Comparative Example 1-(2)

A polyester elastomer of MFR=10 was spun at a resin temperature of 240° C. through a 50 mm-dia. extruder to form an unstretched filament. Then, similarly as in Example 1, the unstretched filament was set in a mold for injection molding as shown in FIG. 3, and an identical resin as the unstretched filament was injected into the mold for injection molding, to form a tape-shaped product as shown in FIG. 1 having a width of 0.65 mm and a thickness of 0.24 mm. This product exhibited a much lower tensile strength of 65 MPa than the tape-shaped product of Example 1.

From these Comparative Examples, effectiveness of disposing stretched filaments in Example 1 is understood.

Comparative Example 2

A tape-shaped product not containing stretched fibrous members unlike the tape-shaped product of Example 1 was produced by extrusion.

<2-(1)>
A tape-shaped product as shown in FIG. 4 was obtained by using a 50 mm-dia. extruder instead of injection molding as in Example 1.

<2-(2)>
A tape-shaped product was formed by extrusion in the same manner as in the above 2-(1), followed successively by stretching at 5.8 times in a hot air oven at 150° C. and relaxation by 10% in a in a hot air oven at 180° C. to obtain a tape-shaped product as shown in FIG. 4.

<2-(3)>
A tape-shaped product was formed by extrusion in the same manner as in the above 2-(1), followed successively by stretching at 6.25 times in a hot air oven at 180° C. and relaxation by 30% in a hot air oven at 320° C. to obtain a tape-shaped product as shown in FIG. 4.

<2-(4)>
A tape-shaped product as shown in FIG. 4 was obtained in the same manner as in the above 2-(2) except that a stretching ratio was changed to 6.9 times.

The tape-shaped products of Comparative Examples 2-(1) to 2-(4) not containing stretched filaments but obtained through extrusion exhibited lower tensile strengths. These extruded products when further subjected to stretching exhibited a large tensile strength but were accompanied with an undesirably larger thermal shrinkability than tape-shaped products at a larger stretching ratio. Further, in any case, these products failed to exhibit a sufficient strength compared with the tape-shaped product of Example 1.

Example 2

A core/sheath-type composite yarn (core/sheath ratio=80/20% by volume) with a core of polyester elastomer of MFR=10 and a sheath of polyester elastomer of MFR=17 was spun at a resin temperature of 240° C. to form an unstretched filament. The unstretched filament was stretched at 5.8 times in a hot air oven of 180° C. to form a stretched filament of 200 μm. The stretched filament exhibited a tensile strength of 437 MPa and an elongation of 71%. By using the stretched filament and a polyester elastomer of MFR=10, a tape-shaped product as shown in FIG. 1 having a width of 0.65 mm and a thickness of 0.24 mm was obtained in the same manner as in Example 1. In this tape-shaped product, the stretched filament occupied 40% of a sectional area perpendicular to a longitudinal direction. The tape-shaped product also exhibited excellent physical properties similarly as the tape-shaped product of Example 1.

Comparative Example 3

A tape-shaped product (as shown in FIG. 5) having cores 6 corresponding to the stretched filament in Example 2 was produced by co-extrusion.

<3-(1)>
Instead of the injection molding in Example 2, a polyester elastomer of MFR=10 and a polyester elastomer of MFR=17 were co-extended so that the polyester elastomer of MFR=10 formed 0.2 mm-dia. cores along both edges of a shaped tape, thus producing a tape-shaped product (width=0.65 mm, thickness=0.24 mm, core diameter=0.2 mm) as shown in FIG. 5 containing cores 6.

<3-(2)>
A core-containing tape-shaped product was formed by co-extrusion in the same manner as in the above 3-(1), and then stretched at 5.8 times in a hot air oven at 150° C. and further relaxed by 10% in a hot air oven at 180° C. to obtain a core-containing tape-shaped product (width=0.65 mm, thickness=0.24 mm, core diameter=0.2 mm) as shown in FIG. 5

<3-(3)>
A core-containing tape-shaped product was formed by co-extrusion in the same manner as in the above 3-(2), and then stretched at 6.25 times in a hot air oven at 180° C. and further relaxed by 10% in a hot air oven at 220° C. to obtain a core-containing tape-shaped product (width=0.65 mm, thickness=0.24 mm, core diameter=0.2 mm) as shown in FIG. 5

<3-(4)>
A core-containing tape-shaped product (width=0.65 mm, thickness=0.24 mm, core diameter=0.2 mm) as shown in FIG. 5 was produced in the same manner as in the 3-(2) above except that a stretch ratio was changed to 6.7 times.

From the above 3-(1) to 3-(4), these stretched core-containing tape-shaped products obtained by forming a tape-shaped product containing core-forming resin along both edges thereof by extrusion and subsequent stretching failed to exhibit a sufficient strength compared with the tape-shaped product obtained by injection molding together with the stretched filament and, if the stretching ratio was further increased for providing an increased strength, were liable to cause a separation between the cores and the tape.

Example 3

A 6/66-copolymer nylon resin having a relative viscosity of 3.5 was spun at a resin temperature of 230° C. through a 50 mm-dia. extruder to obtain an unstretched filament. The unstretched filament was subjected to a first step-stretching at 3.6 times in a warm water bath at 85° C. and then a second step-stretching at 1.5 times in a hot air oven at 185° C., followed by relaxation by 15% in a hot air oven at 165° C. to obtain a stretched filament. The stretched filament exhibited a tensile strength of 815 MPa and an elongation of 45%. Then, similarly as in Example 1, the stretched filament was set in a mold for injection molding as shown in FIGS. 3A and 3B, and an identical resin as the stretched filament was injected at 240° C. into the mold to form a tape-shaped product as shown in FIG. 1. The stretched filament occupied 40% of a sectional area perpendicular to a longitudinal direction of the product. The tape-shaped product exhibited excellent physical properties including a large tensile strength of 581 MPa and a small thermal shrinkability of 0.3%.

Example 4

A polyvinylidene fluoride resin of ηinh=1.0 ("KF #1000", made by Kureha Chemical Industry Co., Ltd) was spun at a resin temperature of 260° C. through a 50 mm-dia. extruder to obtain an unstretched filament. The unstretched filament was subjected to a first step-stretching at 5.6 times in a glycerin bath at 170° C. and then a second step-stretching at 1.15 times in a glycerin bath at 165° C., followed by relaxation by 10% in a glycerin bath at 160° C. to obtain a stretched filament. The stretched filament exhibited a tensile strength of 752 MPa and an elongation of 35%. Then, similarly as in Example 1, the stretched filament was set in a mold for injection molding as shown in FIGS. 3A and 3B, and an identical resin as the stretched filament was injected at 240° C. into the mold to form a tape-shaped product as shown in FIG. 1. The stretched filament occupied 40% of a sectional area perpendicular to a longitudinal direction of the product. The tape-shaped product also exhibited excellent physical properties similarly as the tape-shaped product of Example 3.

Example 5

The same 6/66 copolymer nylon as used in Example 3 was formed into a stretched filament of 200 μm in the same manner as in Example 3 except for changing a second stretching ratio to 1.4 times. This stretched filament exhibited a tensile strength of 761 MPa. Then, similarly as in Example 1, the stretched filament was set in a mold for injection molding, and an identical resin as in Example 4 was injected at 240° C. into the mold to form a tape-shaped product as shown in FIG. 1. The stretched filament occupied 40% of a sectional area perpendicular to a longitudinal direction of the tape-shaped product. The tape-shaped product also exhibited excellent physical properties.

While the products of both Examples 4 and 5 exhibited excellent physical properties, the tape-shaped product of Example 4 exhibited a better physical property in spite of almost equal strengths of the stretched filaments in these Examples. This is attributable to a difference in adhesion between the resin of the stretched filament and the injected resin. Thus, better adhesion between a stretched filament and an injected resin results in better development of a property of the stretched filament in a tape-shaped product.

Example 6

A polyester resin (IV=1.0) was spun at a resin temperature of 275° C. through a 50 mm-dia. extruder to obtain an unstretched filament. The unstretched filament was stretched at 5.5 times and then relaxed by 15% to obtain a stretched filament. Then, similarly as in Example 1, the stretched filament was set in a mold for injection molding as shown in FIGS. 3A and 3B, and an identical resin as in Example 1 was injected at 280° C. into the mold to form a tape-shaped product as shown in FIG. 1. The stretched filament occupied 40% of a sectional area perpendicular to a longitudinal direction of the product. The tape-shaped product exhibited similarly excellent physical properties as the product of Example 3.

Comparative Example 4

A stretched filament-containing tape-shaped product was prepared by injection of a resin different from that of the stretched filament.
<4-(1)>
A core-containing unstretched tape was formed by co-extrusion of an identical polyester resin as used in Example 6 and a polyester elastomer of MFR=1.0. The tape was then subjected to stretching and relaxation heat treatment in a similar manner as in Example 6 to obtain a core-containing stretched tape-shaped product (width=0.65 mm, thickness=0.24 mm, core diameter=0.2 mm). As is understood from the physical properties shown in Table 1, the tape-shaped product exhibited a sufficient strength but failed to exhibit size stability due to a large thermal shrinkability.
<4-(2)>
A tape-shaped product was tried to be formed in the same manner as in Example 1 except for using a stretched filament of polyvinylidene fluoride resin obtained in the same manner as in Example 4 and a polyester elastomer of MFR=10 identical to the one used in Example 1, but the stretched filament of polyvinylidene fluoride resin was melted at a time of injection molding.

TABLE 1

| | | Stretched filament | | | Shaped product | |
| | | | | Tape portion | | |
| | | | Strength | | Strength | Shink |
| Example | Shaping method* | Material** | [MPa] | core Material** | [Mpa] | [%] |
|---|---|---|---|---|---|---|
| 1 | SF-inserted injection | PEE MFR10 | 470 | PEE MFR10 | 338 | 0.3 |
| Comp. 1-(1) | injection | | | PEE MFR10 | 61 | 0.1 |
| Comp. 1-(2) | USF-inserted injection | PEE MFR10 | | PEE MFR10 | 65 | 0.1 |
| Comp. 2-(1) | tape extrusion | | | PEE MFR10 | 70 | 0.1 |
| Comp. 2-(2) | tape extrusion-stretching | | | PEE MFR10 | 235 | 2.5 |
| Comp. 2-(3) | " | | | PEE MFR10 | 198 | 0.3 |
| Comp. 2-(4) | " | | | PEE MFR10 | 293 | 3.3 |
| 2 | SF-inserted injection | core: PEE MFR10 sheath: PEE MFR17 | 437 | PEE MFR10 | 320 | 0.3 |
| Comp. 3-(1) | core/tape extrusion | | | yes core: PEE MFR10 sheath: PEE MFR 17 | 71 | 0.1 |

TABLE 1-continued

| | | Stretched filament | | | | Shaped product | |
|---|---|---|---|---|---|---|---|
| | | | | Strength | Tape portion | Strength | Shink |
| Example | Shaping method* | Material** | [MPa] | core | Material** | [Mpa] | [%] |
| Comp. 3-(2) | core/tape extrusion-stretching | | | yes | core: PEE MFR10 sheath: PEE MFR 17 | 198 | 2.3 |
| Comp. 3-(3) | " | | | yes | core: PEE MFR10 sheath: PEE MFR 17 | 179 | 0.3 |
| Comp. 3-(4) | " | | | yes | core: PEE MFR10 sheath: PEE MFR 17 | 250 | 3.1 |
| 3 | SF-inserted injection | 6/66 copolymer nylon | 815 | | 6/66 copolymer nylon | 581 | 0.3 |
| 4 | " | PVDF | 752 | | PVDF | 522 | 0.3 |
| 5 | " | 6/66 copolymer nylon | 761 | | PVDF | 419 | 0.3 |
| 6 | " | polyester | 653 | | PEE MFR10 | 455 | 0.3 |
| Comp. 4-(1) | core/tape extrusion-stretching | | | yes | core: polyester sheath: PEE MFR10 | 365 | 3 |
| Comp. 4-(2) | SF-inserted injection | PVDF | 752 | | PEE MFR10 | PVDF melted | |

*Abbreviation used: SF = stretched filament, USF = unstretched filament
**Abbreviation used: PEE = polyester elastomer, MFR = melt flow rate, PVDF = polyvinylided fluoride Next, examples of production of ball chain belts are described.

Example 7

As shown in FIG. 7, balls were set at equal intervals in a mold, a stretched filament prepared in Example 1 was disposed at such positions as to be contained along two edges parallel to a longitudinal direction of a resultant shaped product, and an identical resin (polyester elastomer of MFR=1.0) as the stretched filament was injected into the mold to obtain a ball chain belt as shown in FIG. 2 having a width of 2.24 mm, a thickness of 0.24 mm, a hole diameter of 1.63 mm and a hole-hole pitch of 1.73 mm. The stretched filament occupied a portion of sectional area perpendicular to the longitudinal direction at ratios of 5% at a ball-retainer portion (spacer portion) and 43% at a hole diameter position. As physical properties thereof are shown in Table 2, the ball chain belt exhibited a high tensile strength and also a high strength at the ball-retainer portion, and further good size stability due to a small thermal shrinkability. The stretched filament exhibited good adhesiveness without peeling.

Comparative Example 5

Figure 8A:
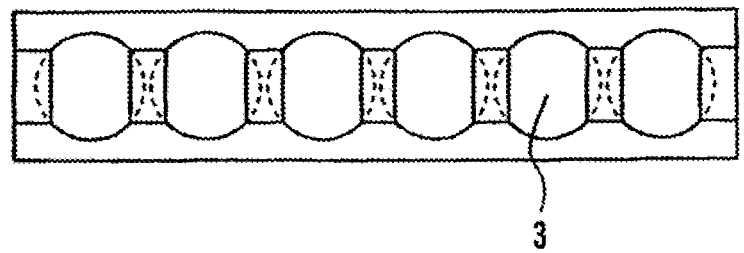
FIGS. 8A-8C show a comparative ball chain belt free of stretched fibrous members, including a planar view (FIG. 8A), a longitudinal side view (FIG. 8B), and a lateral side view (FIG. 8C).
Figure 8B:
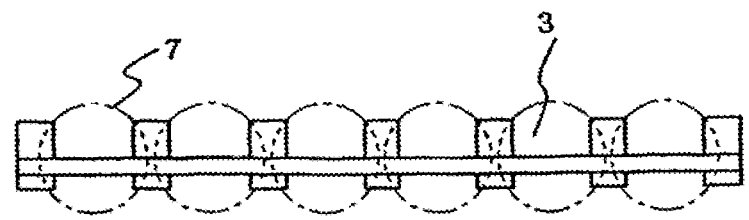
Figure 8C:

A ball chain belt (width=2.24 mm, thickness=0.24 mm, hole diameter=1.63 mm, hole-hole pitch=1.73 mm) as shown in FIGS. 8A-8C (wherein a dashed line 7 represents a ball-inset state) was obtained by injection molding in the same manner as in Example 7 except for omitting the stretched filament.

Example 8

A tape-shaped product having a width of 2.24 mm and a thickness of 0.24 mm prepared in a similar manner as in Example 1 was perforated to form holes having a diameter of 1.63 mm at a hole-hole pitch of 1.73 mm. Then, this perforated tape-shaped product was set in a mold, balls for molding were inset in the holes thereof, and insert molding was performed by injecting a polyester elastomer of MFR=10 to obtain a ball chain belt as shown in FIG. 2.

Comparative Example 6

Tape-shaped products of different stretching ratios were perforated and subjected to insert molding in similar manners as in Example 8 to produce ball chain belts.

<6-(1)>

An identical resin (polyester elastomer of MFR=10) as used in Example 7 was extruded through a 50 mm-dia. extruder to form a tape product (width=2.24 mm, thickness=0.24 mm) as shown in FIG. 4, which was then perforated to form holes having a diameter of 1.63 mm at a hole-hole pitch of 1.73 mm as shown in FIG. 6. Then, this perforated tape-shaped product was set in a mold, balls for molding were inset in the holes, and insert molding was performed to obtain a ball chain belt as shown in FIG. 8.

<6-(2)>

An identical resin as used in Example 7 was extruded into a tape-shaped product in the same manner as in the above 6-(1), which was then stretched at 5.8 times in a hot air oven at 150° C. and then relaxed by 10% in a hot air oven at 180° C. to obtain a stretched tape. This tape was used for perforation and insert molding in the same manner as in the above 6-(1) to obtain a ball chain belt as shown in FIG. 8.

<6-(3)>

A ball chain belt was obtained in the same manner as in the above 6-(2) except for changing a stretching ratio to 6.9 times.

<6-(4)>

An identical resin as used in Example 7 was extruded into a tape-shaped product in the same manner as in the above 6-(1), which was then stretched at 6.25 times in a hot air oven at 180° C. and then relaxed by 30% in a hot air oven at 220° C. to obtain a stretched tape. This tape was used for perforation and insert molding in the same manner as in the above 6-(1) to obtain a ball chain belt as shown in FIG. 8.

In the above 6-(1) to 6-(4), there occurred molding failures, such as insufficient filling of resin at spacer portions and "fins" caused by entering of resin into holes.

Example 9

Insert molding was performed in the same manner as in Example 7 except for using a core/sheath composite stretched filament obtained in Example 7 to prepare a ball chain belt as shown in FIG. 2.

Comparative Example 7

Figure 9A:
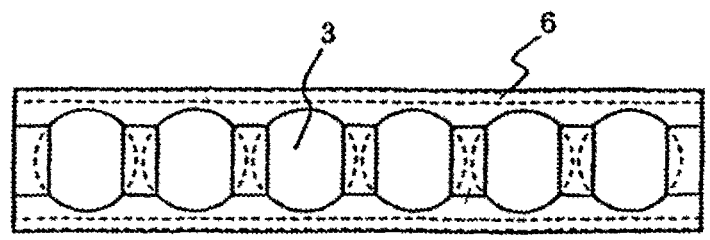
FIGS. 9A-9C show a comparative ball chain belt free of stretched fibrous members, including a planar view (FIG. 9A), a longitudinal side view (FIG. 9B) and a lateral side view (FIG. 9C).
Figure 9B:
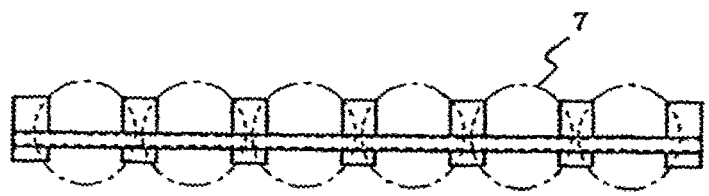
Figure 9C:
Figure 10:
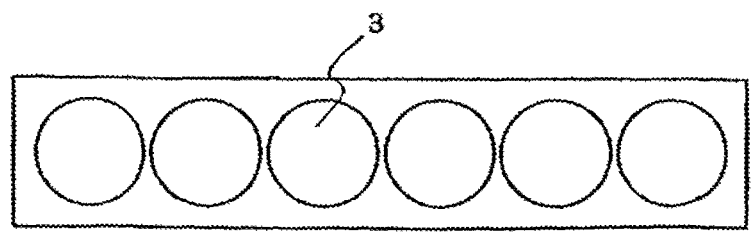
FIG. 10 is a view showing a state of forming ball-insetting holes in a comparative tape-shaped product free of stretched fibrous members.

Core-containing composite tapes were prepared by co-extruding a polyester elastomer of MFR=10 as a core resin together with a polyester elastomer of MFR=17, and used for production of ball chain belts as shown in FIGS. 9A-9C, wherein a dashed line 7 represents a ball-inset state.

<7-(1)>

A composite tape containing a core was prepared by co-extruding a polyester elastomer of MFR=10 as a core resin together with a polyester elastomer of MFR=17. This tape was subjected to perforation and insert molding in the same manner as in Example 6 to obtain a ball chain belt as shown in FIGS. 9A-9C.

<7-(2)>

A core-containing composite tape was prepared by co-extruding a polyester elastomer of MFR=10 as a core resin together with a polyester elastomer of MFR=17, followed by stretching at 5.8 times in a hot air oven at 150° C., followed by relaxation by 10% in a hot air oven at 180° C. to obtain a stretched tape. This tape was subjected to perforation and then insert molding in the same manner as in Comparative Example 6 to obtain a ball chain belt as shown in FIGS. 9A-9C.

7-(3)>

A ball chain belt was obtained in the same manner as in the above 7-(2) except for changing a stretching ratio to 6.7 times.

<7-(4)>

A core-containing composite tape was prepared by co-extruding a polyester elastomer of MFR=10 as a core resin together with a polyester elastomer of MFR=17, followed by stretching at 6.25 times in a hot air oven at 180° C., followed by relaxation by 30% in a hot air oven at 220° C. to obtain a stretched tape. This tape was subjected to perforation and then insert molding in the same manner as in Comparative Example 6 to obtain a ball chain belt as shown in FIGS. 9A-9C.

In any case of the above 7-(1) to 7-(4), many defective products occurred due to difficulty of molding, and products obtained appeared normal but were far from practical use due to small tensile strength and small strength at retaining portions.

Example 10

A nylon stretched filament prepared in Example 3 was set in a mold as shown in FIG. 7, and an identical resin as the stretched filament was injected into the mold to obtain a ball chain belt (width=2.24 mm, thickness=0.24 mm, hole diameter=1.63 mm, hole-hole pitch=1.73 mm) as shown in FIG. 2 in a similar manner as in Example 7.

Example 11

A polyvinylidene fluoride resin stretched filament prepared in Example 4 was set in a mold as shown in FIG. 7, and an identical resin as the stretched filament was injected into the mold to obtain a ball chain belt (width=2.24 mm, thickness=0.24 mm, hole diameter=1.63 mm, hole-hole pitch=1.73 mm) as shown in FIG. 2 in a similar manner as in Example 7.

Example 12

A nylon stretched filament prepared in Example 5 was set in a mold as shown in FIG. 7, and an identical resin as the stretched filament was injected into the mold to obtain a ball chain belt (width=2.24 mm, thickness=0.24 mm, hole diameter=1.63 mm, hole-hole pitch=1.73 mm) as shown in FIG. 2 in a similar manner as in Example 7. The stretched filament occupied a portion of sectional area perpendicular to a longitudinal direction at ratios of 5% at a ball-retainer portion (spacer portion) and 43% at a hole diameter position.

The products of Examples 11 and 12 both exhibited excellent results. A reason why the product of Example 11 exhibited better properties is that adhesion between the stretched filament and the injected resin was better in Example 11, similarly as in the case of Examples 4 and 5.

Comparative Example 8

A polyvinylidene fluoride resin stretched filament prepared in Example 4 was set in a mold as shown in FIG. 7, and a polyester elastomer of MFR=10 was injected into the mold for insert molding to produce a bal chain belt (width=2.24 mm, thickness=0.024 mm, hold diameter=1.63 mm, hole-hole pitch=1.73 mm) as shown in FIG. 2, in a similar manner as in Example 7, whereas the polyvinylidene fluoride resin was melted at a time of the insert molding.

Example 13

A polyester stretched filament prepared in Example 6 was set in a mold as shown in FIG. 7, and a polyester elastomer of MFR=10 was injected into the mold to obtain a ball chain belt (width=2.24 mm, thickness=0.24 mm, hole diameter=1.63 mm, hole-hole pitch=1.73 mm) as shown in FIG. 2 in a similar manner as in Example 7.

The ball chain belts prepared in the above Examples 7-13 all exhibited sufficiently large tensile strength and strength at the retaining portion, thus exhibiting excellent performances as a ball chain belt.

Comparative Example 9

Glass fiber (multi-filaments in a form of bundle of 120 filaments of each 9.4 u m in diameter) wound about a bobbin was supplied to a die and polyester elastomer used in Example 7 was heated through an extruder and supplied to the die to be extruded so as to cover the glass fiber, thereby obtaining a core-containing composite tape-shaped product as shown in FIG. 5. Then, the tape-shaped product was subjected to perforation and insert molding in a similar manner as in Comparative Example 6 to obtain a ball chain belt as shown in FIGS. 9A-9C, wherein adhesion between the glass fiber and the polyester elastomer was insufficient to cause peeling of the glass fiber and cutting of filaments.

Comparative Example 10

A ball chain belt as shown in FIGS. 9A-9C was prepared in the same manner as in Comparative Example 9 except for using carbon fiber (multifilaments in a form of bundle of 80 filaments, each being 10 μm in diameter). In the belt, adhesion between the carbon fiber and the polyester elastomer was insufficient to cause peeling of the carbon fiber and cutting of filaments.

TABLE 2

| Example | Shaping method* | Stretched filament Material** | Strength [MPa] | Extruded tape material** | Perforation | Ball retainer Injection molded material** | Tensile strength [MPa] | Retaining strength [MPa] | Thermal shrink [%] | Molding defects*** |
|---|---|---|---|---|---|---|---|---|---|---|
| 7 | SF-inserted injection | PEE MFR10 | 470 | | | PEE MFR10 | 213 | 73 | 0.3 | A |
| Comp. 5 | injection | | | | | PEE MFR10 | 61 | 53 | 0.3 | A |
| 8 | Method 1 | PEE MFR10 | 470 | | yes | PEE MFR10 | 207 | 38 | 0.3 | B |
| Comp. 6-(1) | Method 2 | | | PEE MFR10 | yes | PEE MFR10 | 70 | 37 | 0.1 | C |
| Comp. 6-(2) | Method 3 | | | PEE MFR10 | yes | PEE MFR10 | 113 | 35 | 3.1 | C |
| Comp. 6-(3) | Method 3 | | | PEE MFR10 | yes | PEE MFR10 | 195 | 35 | 3.8 | C |
| Comp. 6-(4) | Method 3 | | | PEE MFR10 | yes | PEE MFR10 | 98 | 37 | 0.3 | C |
| 9 | SF inserted injection | core: PEE MFR10 sheath: PEE MFR17 | 437 | | | PEE MFR10 | 208 | 110 | 0.3 | A |
| Comp. 7-(1) | Method 4 | | | core: PEE MFR10 sheath: PEE MFR17 | yes | PEE MFR10 | 68 | 35 | 0.2 | C |
| Comp. 7-(2) | Method 5 | | | core: PEE MFR10 sheath: PEE MFR17 | yes | PEE MFR10 | 100 | 35 | 2.8 | C |
| Comp. 7-(3) | Method 5 | | | core: PEE MFR10 sheath: PEE MFR17 | yes | PEE MFR10 | 165 | 34 | 3.3 | C |
| Comp. 7-(4) | Method 5 | | | core: PEE MFR10 sheath: PEE MFR17 | yes | PEE MFR10 | 89 | 38 | 0.3 | C |
| 10 | SF-inserted injection | 6/66 co-Ny | 815 | | | 6/66 co-Ny | 464 | 140 | 0.2 | A |
| 11 | SF-inserted injection | PVDF | 752 | | | PVDF | 383 | 131 | 0.3 | A |
| 12 | SF-inserted injection | 6/66 co-Ny | 761 | | | PVDF | 311 | 86 | 0.3 | A |
| 13 | SF-inserted injection | polyester | 653 | | | PEE MFR10 | 329 | 130 | 0.3 | A |
| Comp. 8 | | PVDF | 752 | | | PEE MFR10 | melted | | | |
| Comp. 9 | Method 4 | | | core: glass fiber sheath: PEE | yes | PEE MFR10 | melted & cut | | | |
| Comp. 10 | Method 4 | | | core: carbon fiber sheath: PEE | yes | PEE MFR10 | melted & cut | | | |

*SF = stretched filament; Method 1 = SF-inserted injection→perforation→injection molding of spacer portion. Method 2 = tape extrusion→perforation→injection molding of spacer portion Method 3 = tape extrusion→stretching→perforation→injection molding of spacer portion Method 4 = extrusion of core-containing tape→perforation→ injection molding of spacer portion Method 5 = extrusion of core-containing tape→stretching→perforation→injection molding of spacer portion
**PEE = polyester elastomer, PVDF = polyvinylidene flouride, co-Ny = copolymer nylon.
***molding defects (insufficient filling, fins) A = none, B = few, C = many Example 14

Figure 11:
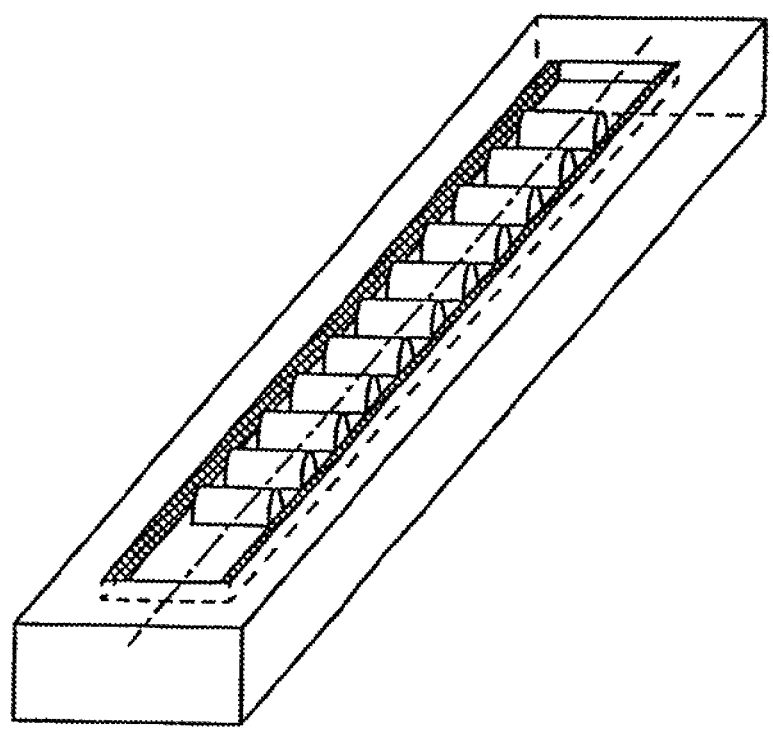
FIG. 11 is a view showing a state wherein rollers are set in a mold for forming a roller-type ball chain belt of the invention.
Figure 12A:
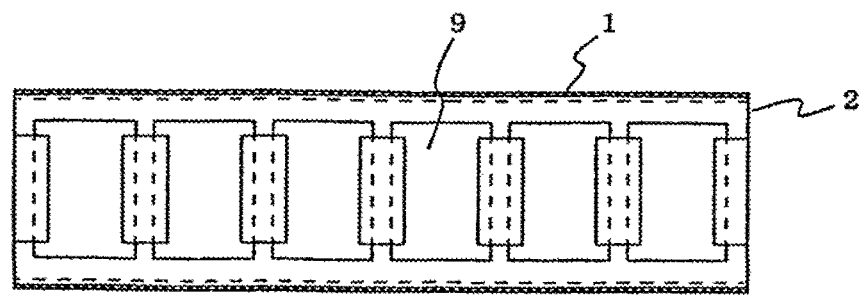
FIGS. 12A-12C show views of a roller-type ball chain belt of the invention, including a planar view (FIG. 12A), a longitudinal side view (FIG. 12B), and a lateral side view (FIG. 12C).
Figure 12B:
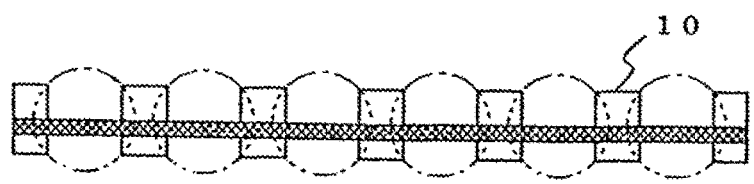
Figure 12C:
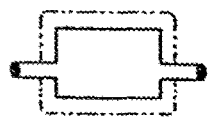

As shown in FIG. 11, rollers were set at equal intervals in a mold, and a stretched filament prepared in Example 1 was disposed at such positions as to be contained along two edges parallel to a longitudinal direction of a resultant shaped product, and an identical resin (polyester elastomer of MFR=1.0) as the stretched filament was injected into the mold to obtain a roller-type ball chain belt as shown in FIGS. 12A-12C having a width of 2.24 mm, a thickness of 0.24 mm, a hole in a width direction of 1.63 mm and a hole-hole pitch of 1.73 mm. The stretched filament occupied a portion of sectional area perpendicular to the longitudinal direction at ratios of 5% at a roller-retainer portion (spacer portion) and 43% at a hole diameter position. The roller-type ball chain belt exhibited a high tensile strength and also a high strength at the ball-retainer portion, and further exhibited good size stability due to a small thermal shrinkability. The stretched filament exhibited good adhesiveness without peeling.

Example 15

Figure 13:
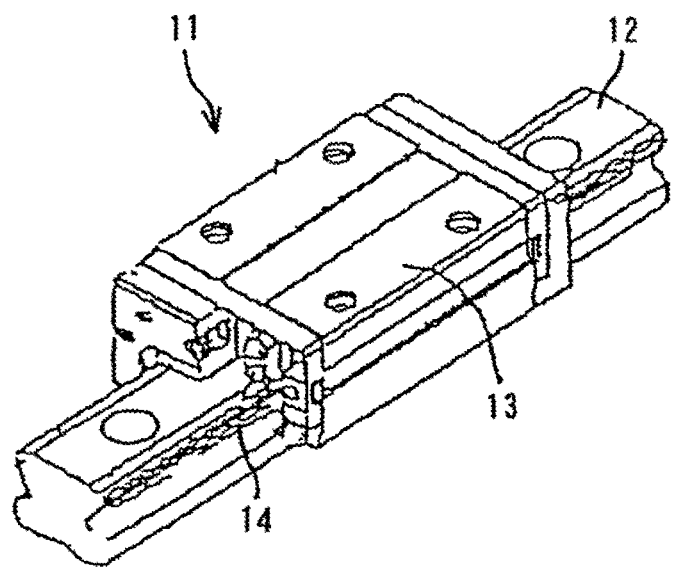
FIG. 13 is a perspective view of a linear motion guide device in which a ball chain according to the invention has been incorporated.

A ball chain was prepared by insetting balls in a ball chain belt obtained in the same manner as in Example 7. The ball chain was used to prepare a linear motion guide device as shown in FIG. 13 including a tracking rail 12, a moving block body 13 and ball chain 14.

Example 16

Figure 14:
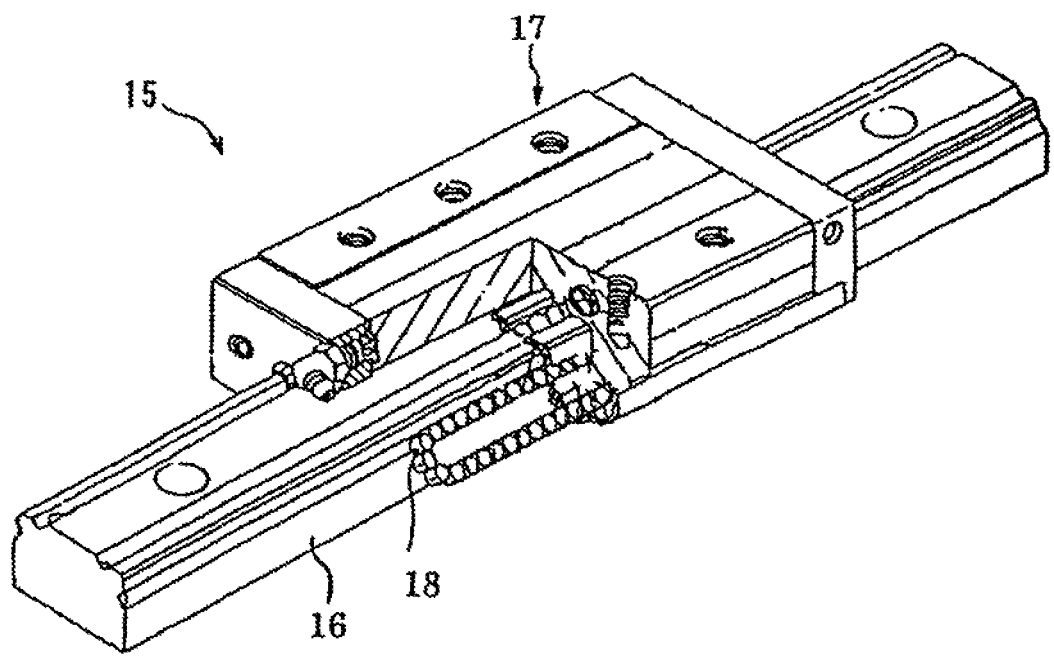
FIG. 14 is a perspective view of a linear motion guide device in which a roller-type ball chain according to the invention has been incorporated.

A roller-type ball chain was prepared by insetting rollers in a ball chain belt obtained in the same manner as in Example 14. The ball chain was used to prepare a linear motion guide device 15 as shown in FIG. 14 including a tracking rail 16, a moving block body 17 and roller-type ball chain 18.

Example 17

Figure 15:
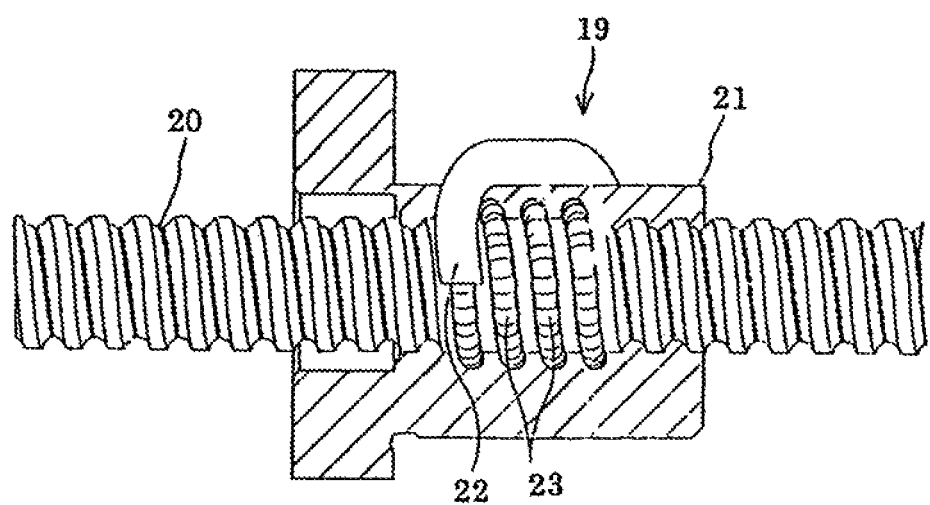
FIG. 15 is a sectional view of a ball screw in which a ball chain according to the invention has been incorporated.

A ball chain was prepared by insetting balls in a ball chain belt obtained in the same manner as in Example 7. The ball chain was used to prepare a ball screw 19 as shown in FIG. 15 including a screw shaft 20, a nut member 21, a return pipe 22 and ball chain 23.

It became clear that the linear motion guide devices prepared in Examples 14 and 15, and the ball screw prepared in Example 17, all withstood a long period of use, whereby it was proved that the ball chain belt and ball chain according to the present invention could be excellent members of such linear motion guide device and ball screw device.

INDUSTRIAL APPLICABILITY

According to the present invention of effecting injection molding after setting a stretched fibrous member in a mold, it is possible to obtain a tape-shaped product having a large strength that is not attainable by a conventional extrusion product or a mere injection-molded product.

Further, a ball chain belt having a large strength obtained by subjecting such a tape-shaped product to perforation and injection molding of portions for retaining rolling members (such as balls or rollers) or by injection molding after setting a stretched fibrous member and balls for molding, is allowed to provide a product which exhibits a large strength not realizable by a ball chain belt formed by (co-)extrusion. Further, the stretched fibrous member disposed along both edges of the tape-shaped product not only contributes to strength but also reinforces a weld and remarkably reduces molding defects.

By insetting prescribed balls (or rollers) in the ball chain belt thus-obtained of the present invention, a ball chain is obtained. The ball chain can exhibit excellent performances when incorporated in a linear motion guide device equipped with an endless circulation path, or a ball screw, and the like.

The invention claimed is:

1. A method of producing a belt for ball chain, comprising:

stretching a yet-unstretched fibrous member of a thermoplastic resin per se to form an elongated stretch-oriented fibrous member of the thermoplastic resin, wherein the elongated stretch-oriented fibrous member includes oriented molecular chains of the thermoplastic resin oriented longitudinally along the elongated stretch-oriented fibrous member and has a tensile strength of at least 300 MPa which is greater than a tensile strength of the yet-unstretched fibrous member, setting, in a mold, balls for molding each having a diameter slightly larger than balls to be retained in a resultant shaped product so as to be aligned in a straight line along a central portion of the resultant shaped product, and the elongated stretch-oriented fibrous member of the thermoplastic resin so as to be contained along longitudinally parallel edges or in proximity thereof of the resultant shaped product, injection-molding a moldable synthetic resin by injecting the moldable synthetic resin into the mold in which the balls and the elongated stretch-oriented fibrous member have been set, to form a tape portion and a retaining portion integrally, and then removing the balls for molding to leave holes for retaining balls of the ball chain, thereby to form a belt for ball chain, which comprises:

(i) a reinforced tape of synthetic resin, comprising, (i-1) an injection-molded un-stretched tape of a synthetic resin, and (i-2) an elongated stretch-oriented fibrous member of the thermoplastic resin embedded integrally within the un-stretched tape, wherein the elongated stretch-oriented fibrous member of the thermoplastic resin has a length substantially identical to that of the un-stretched tape, wherein the reinforced tape is provided with a tensile strength of at least 250 MPa and a thermal shrinkability of at most 1% when subjected to standing at 40° C. for 24 hours; and (ii) the holes for retaining balls of the ball chain along the central portion of the reinforced tape, wherein (iii) the synthetic resin forming the yet-unstretched tape and the thermoplastic resin forming the elongated stretch-oriented fibrous member comprise identical resins or include identical resins as principal constituents, and wherein (iv) the synthetic resin forming the unstretched tape and the thermoplastic resin forming the elongated stretch-oriented fibrous member comprise a pair of resins selected from the group consisting of polyester elastomer/polyester elastomer, 6/66 copolymer nylon/6/66 copolymer nylon, polyvinylidene fluoride/polyvinylidene fluoride, and polyester/polyester elastomer.

2. A method of producing a belt for ball chain according to claim 1, wherein the fibrous member is in a form of a monofilament.

3. A method of producing a belt for ball chain according to claim 1, wherein the belt for ball chain has a tensile strength of at least 100 MPa and a thermal shrinkability of at most 1%, respectively after being provided with the holes.

* * * * *